United States Patent [19]

Kollross

[11] 4,354,295
[45] Oct. 19, 1982

[54] DEVICE FOR AXIAL SHIRRING OF SYNTHETIC TUBULAR MATERIAL FOR FURTHER PROCESSING, ESPECIALLY ON AUTOMATED SAUSAGE STUFFERS

[76] Inventor: Gunter Kollross, AM Wallerstadter Weg 20, D-6081 Dornheim, Fed. Rep. of Germany

[21] Appl. No.: 204,167

[22] Filed: Nov. 5, 1980

[30] Foreign Application Priority Data

Nov. 5, 1979 [DE] Fed. Rep. of Germany ....... 2944623

[51] Int. Cl.³ .............................................. A22C 13/02
[52] U.S. Cl. ....,..................................... 17/1 R; 17/42
[58] Field of Search ....................... 17/33, 41, 42, 1 R, 17/49; 53/122, 576, 575, 581, 469

[56] References Cited

U.S. PATENT DOCUMENTS

| | | | |
|---|---|---|---|
| 3,310,833 | 3/1967 | Clement | 17/42 |
| 3,461,484 | 8/1969 | Arnold | 17/42 X |
| 4,176,204 | 11/1979 | Winkler | 17/42 X |
| 4,185,358 | 1/1980 | Regner et al. | 17/42 |

FOREIGN PATENT DOCUMENTS

| | | |
|---|---|---|
| 2147498 | 12/1973 | Fed. Rep. of Germany . |
| 1632137 | 5/1974 | Fed. Rep. of Germany . |
| 2403470 | 2/1981 | Fed. Rep. of Germany . |
| 784443 | 10/1957 | United Kingdom ..................... 17/42 |

Primary Examiner—Willie G. Abercrombie
Attorney, Agent, or Firm—Larson and Taylor

[57] ABSTRACT

A device for axial shirring of synthetic tubular material by forming a continuous helical fold. As the unshirred tubular material moves along a mandrel, it is engaged by the vanes of at least three shirring tolls having their axes located in a plane transverse to the mandrel. This assembly of shirring rolls revolves about the mandrel axis and the individual shirring rolls have peripheral vanes parallel to their respective axes. The shirring rolls are interconnected for timed rotation with each other and preferably they are all driven from the assembly revolving drive means. The vanes of the rolls have arcuate recesses or grooves which correspond to the mandrel surface, which overlap each other circumferentially about the mandrel surface, and which are so positioned about their respective axes that the vanes of any given shirring roll directly follows a vane of the preceeding shirring roll taken in the direction of revolution and in the direction of advance of the tubular material.

10 Claims, 3 Drawing Figures

DEVICE FOR AXIAL SHIRRING OF SYNTHETIC TUBULAR MATERIAL FOR FURTHER PROCESSING, ESPECIALLY ON AUTOMATED SAUSAGE STUFFERS

The invention relates to a device for axial shirring of synthetic tubular material for further processing, especially on automated sausage stuffers, comprising an assembly of shafts which revolve bodily about a shirring mandrel and include shirring rolls which rotate about axes located in a plane transverse to the mandrel axis in a direction of rotation so as to advance the tubular material being shirred. Each shirring roll is provided at its periphery with teeth that are parallel to the roll shafts and are grooved in an arc to correspond to the shirring mandrel cross section.

In a known device of this type (see West German Pat. No. 24 03 470) two shirring rolls are rotatably driven about two parallel shafts and have teeth which are grooved in the shape of a semicircle, and which engage alternately the half of the mandrel periphery with the tubular material drawn thereon and inflated through the hollow mandrel. The two rolls then revolve together, by means of a separate adjustable drive, about the shirring mandrel. The revolving of the roll shafts about the shirring mandrel leads to a continuous division of the puckered zones produced at the peripheral ends of the grooves, over the periphery of the shirred tubular material. Consequently the shirring ratio, which is the ratio of unshirred length of tubular material to the length of the shirring formed by the shirring operation, can be substantially increased, while simultaneously improving the stiffness of the shirring. There is a high degree of compacting of the tubular material in the "pucker zones" between folds, which folds respectively extend about half the perimeter of the mandrel precisely because of the continuous shifting in the peripheral direction. This leads to considerable stressing in the region of these folds, which results in an unsatisfactory shirring at the exterior and allows the danger of damage to the tubular material.

For this reason, the attempt has already been made to form a single continuous main fold as a helix. A known device, as shown in West German Pat. No. 16 32 137, uses for this purpose three shirring rolls drivable about fixed axis shafts located in a plane transverse to the shirring mandrel, with grooved teeth at the periphery which run obliquely with reference to the roll shafts. Each roll engages a third of the periphery of the shirring mandrel. By shifting the shirring rolls peripherally by a third of the tooth division, the flanks of the teeth are brought into the zone of engagement on a practically uninterrupted helix. This arrangement moves the tubular material onto the mandrel with formation of the desired continuous helicoidal fold, and presses it against a stop on the mandrel or against a shirring already formed thereon. In this known device, however, there is the risk of damaging the tubular material as it is drawn into the shirring zone between the teeth of two adjacent shirring rolls.

Another known device for production of a continuous helicoidal fold, as shown in West German Pat. No. AS 21 47 498, provides for application of the axial shirring force with the force acting constantly on the tubular material to be shirred, always at the same axial location along the mandrel, while revolving about the mandrel axis. This revolving motion can be effected either by a sleeve with a helicoidally wound projection at the interior, like an inner worm which turns about the mandrel axis, or by a set of untoothed gears disposed on a helicoidal line about the mandrel, each with a blade-formed outer periphery. It is true that with this device there is no danger of pinching the tubular material. However, the end of the helicoidal projection or the gear which corresponds thereto, on the side toward the shirring, which presses the newly formed fold in constant rotary action against the end of the shirring that is already formed, leads, however, to an extremely sharp bend of the tubular material in the outer zone of the fold. This can readily lead to damage of the tubular material at this point. Moreover, since forming a helicoidal pitch of the fold requires a full rotation of the sleeve or of the shirring gear about the mandrel axis, for economical production of the shirrings the sleeve or the gears rotate at very high speeds about the mandrel shaft. Especially with rather large calibers, this leads to considerable peripheral speeds at the points of engagement of the axial force that serves for the shirring, and this can only be mastered by delivery of suitable quantities of a fluid lubricant.

The invention therefore concerns the problem of developing a device for axial shirring of synthetic tubular material with formation of helicoidally running main fold, which, without danger of damage to the tubular material and also without excessive amounts of a fluid lubricant, will yield a high shirring ratio with simultaneous high rigidity of the shirring that is formed.

This problem is solved according to the invention in that the number of shirring rolls in a known way amounts to at least three, in that the vanes of the rolls present such width that their grooves overlap each other on the periphery of the mandrel, and in that the vanes of the shirring rolls are so staggered about the rolls axes in the peripheral direction, that when the assembly revolves about the shirring mandrel, the vanes of any shirring roll will move into engagement with the tubular material to advance it immediately following the vanes of the adjacent shirring roll which preceeds it in the direction of the revolution around the mandrel axis and in the direction of advance of the tubular material.

Many experiments using different tubular calibers have shown that with the device according to the present invention an extremely compact tubular shirring can be produced with a continuous helicoidal fold. Since, with the present invention, the shirring rolls rotating about their shafts continuously move the tubular material forward, and since the circulating axial force acts constantly on the tubular material to be shirred, the invention requires only a fraction of the rotational speed required for prior, known devices. Stress upon the tubular material in the fold formations is consequently comparatively slight, and the whole device works very smoothly with high output. In an entirely surprising way, the opposed shifting of the vanes of the individual shirring rolls in the peripheral direction (as contrasted to a shift in which the following vane follows not only peripherally but also axially) leads to the desired acceptable fold formation without the risk of air inclusions in the folds. The product is an extremely compact shirring with high rigidity which satisfies the highest demands of the processors.

In an advantageous embodiment of the invention the rotational speed of the shirring rolls is in the same order of magnitude as the speed with which the roll assembly revolves about the axis of the mandrel. An RPM ratio of 1:1 has turned out to be extremely favorable. Deviations in the range between 1:2 and 2:1 also lead however to fully satisfactory results. In any case there is no need to adjust between the RPM of the shirring rolls and the RPM of the revolving of the roll assembly about the mandrel, so that a particular feature of the invention consists therein that the ratio of the RPM of rotation of the shirring rolls to the RPM of the revolving of the roll assembly about the shirring mandrel is constant. In a further advantageous embodiment of the invention, this feature allows the rotational drive of the shirring rolls to be taken from the revolving movement of the roll assembly about the mandrel axis. This result can be achieved in an especially advantageous way if the shirring rolls are in driving connection with a worm gear which moves about the shirring mandrel together with the roll assembly and thereby rolls on a stationary annular worm gear.

To achieve the above described results of the invention, the minimum number of shirring rolls is three. However the use of four rolls has proved to be particularly advantageous.

The number of vanes per shirring roll is governed by the number of shirring rolls, and the thickness of the vanes. The vanes of the shirring rolls are practically in contact with one another in the zone of overlap.

It has further been found to be particularly advantageous if, in revolving about the mandrel axis, the forward running ends of the grooves are rounded outwardly. In this manner, the tubular material is handled in an especially protective manner in the shirring.

Still another feature of a preferred embodiment of the invention consists in that the vanes of the shirring rolls are of an elastic material. This ensures a protective yet firm pressing of the newly formed folds against the shirrings that have already been formed. A particularly good material for the vanes has turned out to be synthetic rubber.

A preferred embodiment of a shirring device according to the invention, with four shirring rolls, is discussed below with reference to the drawing.

Figure 1:
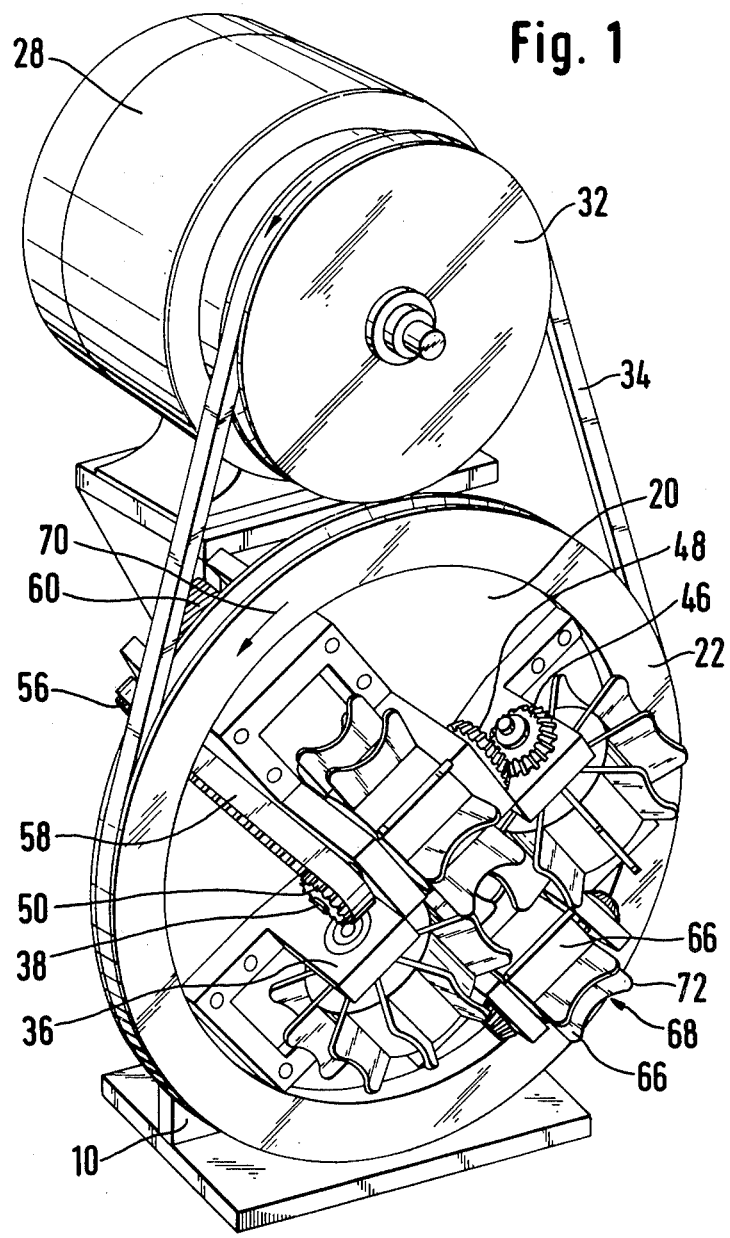
FIG. 1 shows in perspective a view of the discharge side of the shirring device of the present invention.

As shown in the figures, a bearing sleeve 12 (see FIG. 2) is fixed, e.g. by welding, onto a bearing block 10. In said sleeve 12 a sleevelike shaft 18 is rotatably borne by means of ball bearings 14, 16. A circular bearing plate 20 is bolted on the front end of sleevelike shaft 18, and an annular drive pulley 22 is bolted to plate 20. Plate 20 also has a central perforation 24.

A bracket 26, welded on the upper end of bearing block 10, supports an electric motor 28, which is preferably regulatable. Another pulley 32 is fixed on the drive shaft 30 of electric motor 28 and is in driving connection with pulley 22 of bearing plate 20 via a belt 34. Bearing plate 20, on the side thereof facing away from shaft 18, has four U-shaped bearing blocks 36 distributed around central perforation 24, in which blocks the shafts 38 of the respective shirring rolls 40 are borne. The shirring rolls 40 are disposed between the extremities of the bearing blocks and thereby, as seen in the frontal view of the device, constitute a regular star in whose center a hollow shirring mandrel 42 is disposed (not shown in FIG. 1). The mandrel 42 extends from a clamping place (not illustrated), in a cantilever manner through the shirring device, coaxially to shaft 18, and guides the tubular material which is fed in the direction of arrow 44 (FIG. 2) and receives the tubular material as a shirring which is braced against a stop on mandrel 42 (not shown, but located to the right of FIG. 2).

Shafts 38 with the shirring rolls 40 are interconnected to rotate in the same direction of rotation by three pairs of tapered gears 46, 48. One of the shafts 38 which has only one tapered gear is provided at its other end with a toothed belt roll 50. On the side of bearing plate 20 which faces toward the sleevelike shaft 18, another bearing block 52 is fixed near the periphery of plate 20. A shaft 54 is borne in block 52 and supports a toothed belt roll 56 on its projecting end, said roll 56 being connected in a driving connection via a belt 58 with toothed belt roll 50 and thereby with all the shirring rolls 40. On shaft 54 between the extremities of the bearing block 52 there is fixed a spur gear 60 the teeth of which are engaged with the helical thread 62 of an annular part 64 which is bolted to bearing sleeve 12.

It will be apparent that when the electric motor 28 is switched on and bearing plate 20 with shirring rolls revolves about shirring mandrel 42, spur gear 60 will receive a motion of rotation from thread 62 of annular part 64 and thereby shirring rolls 40 will rotate about the axes of their shafts 38. The pitch of thread 62 and of worm gear 60 is advantageously so selected that the shirring rolls 40 will execute a rotation about their respective shafts as they execute such a revolution about bearing plate 20.

Figure 2:
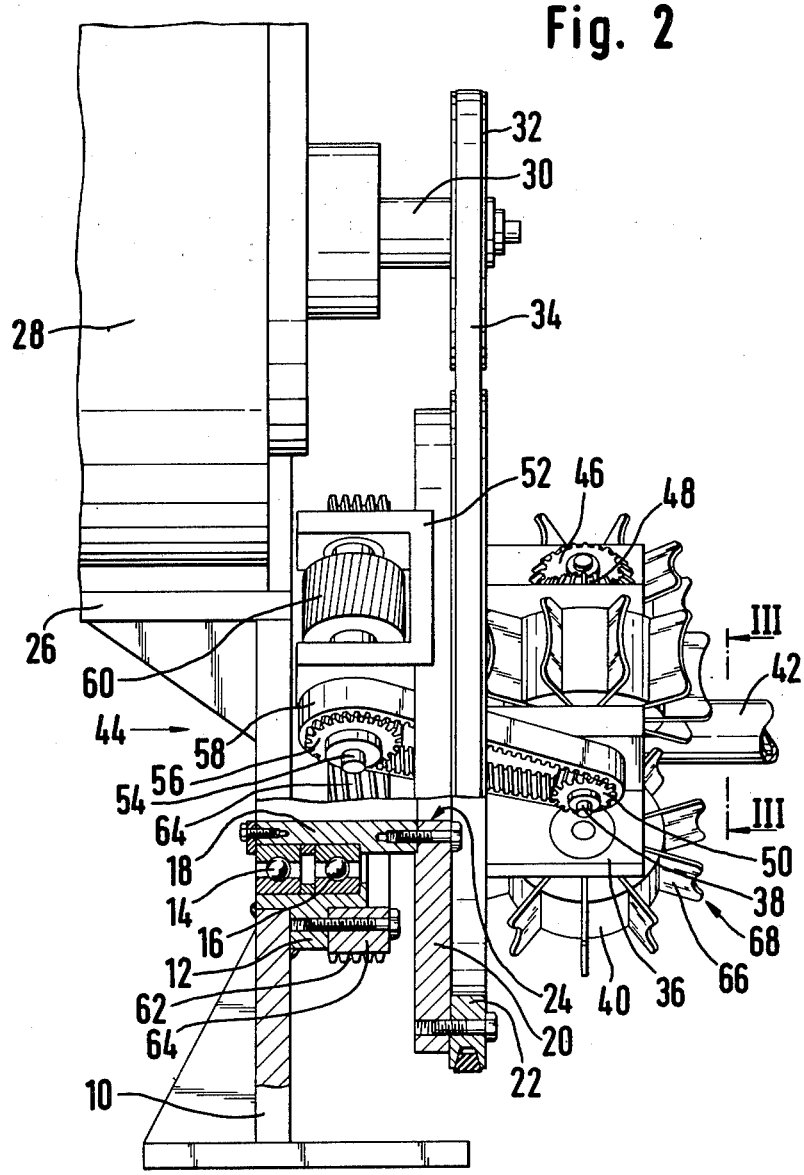
FIG. 2 shows a lateral view taken from the left side of FIG. 1, partly in axial section.

As shown in the example of FIGS. 1 and 2, each shirring roll 40 is provided with ten vanes 66 at its periphery, the width of the vanes being greater than the diameter of shirring mandrel 42. The vanes comprise an elastic material such as advantageously synthetic rubber, and they have such a thickness that the distance between two successive vanes of a shirring roll corresponds, in the region of the base of the vanes, to about three times the thickness of each vane.

Figure 3:
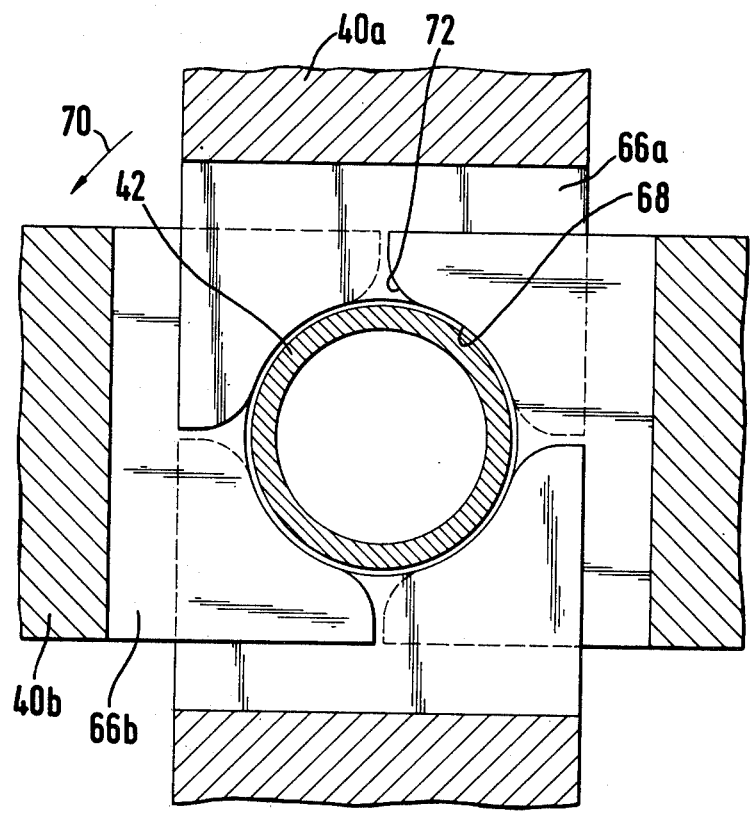
FIG. 3 shows on a larger scale a partial frontal view of the engagement zone of the shirring rolls, taken in the direction of arrows III—III of FIG. 2, to illustrate the staggering of the teeth in relationship to the direction of revolution of the roll assembly about the mandrel axis.

As particularly shown in FIG. 3, vanes 66 have a somewhat semicircular groove 68 at their outer ends. These grooves supplement each other in the zone of engagement with the shirring mandrel 42 to constitute a full circle, and they enclose the mandrel 42 at a slight axial distance from each other. As can be seen in FIG. 3, the vanes of adjacent shirring rolls overlap peripherally about the mandrel. Also, the vanes are so positioned peripherally about their own axes 38 that in rotation of supporting plate 20 about shirring mandrel 42 in the direction of arrow 70, the vane of any shirring roll 40, such for example as vane 66a of shirring roll 40a (FIG. 3) will run out ahead of vane 66b in the direction of arrow 70 of roll 40b which runs ahead of it in the feed direction of the tubular material, i.e. toward the viewer of FIG. 3. This arrangement is essential for the acceptable formation of a helicoidally wound shirring fold.

As further shown in FIG. 3, as well as in the other figures, groove 68 of each vane 66 is outwardly rounded in the direction of arrow 70, on the end that runs out ahead, as indicated in FIG. 3 at 72. This ensures that the vane which is simultaneously revolving about the shirring mandrel axis as it approaches the tubular material on the side of the tube will not damage the tubular material in any circumstances and that it comes gently into engagement with the tubular material.

The illustrated and described embodiment is especially suitable for example for a tube diameter (caliber) of 40 mm, for which shirring mandrel 42 would have a diameter of 33 mm. As experiments have demonstrated, with the illustrated and described embodiment, at a rotational speed of electric motor 28 of 1500 RPM which corresponds to an RPM of 700 for the bearing plate 20, about 5 meters per second of tubular material can be shirred to an extremely compact shirring that has a continuous helicoidal main fold, without any recognizable indication of damage to the tubular material.

Although the invention has been described in considerable detail with respect to preferred embodiments thereof, it will be apparent that the invention is capable of numerous modifications and variations, apparent to those skilled in the art, without departing from the spirit and scope of the invention, as defined in the claims.

I claim:

1. A device for axial shirring of synthetic tubular material, such as for use on an automated sausage stuffer, comprising:

an assembly of at least three shirring rolls rotatable about axes, all of which axes are located in a common plane, the shirring rolls being distributed equiangularly about a central opening adapted to receive a cylindrical mandrel, such that the periphery of the rolls all include a portion facing the mandrel and the said common plane of the axes is transverse to the axis of the mandrel, means for mounting the assembly for revolving movement about the mandrel, each of said shirring rolls having a plurality of vanes, the outer ends of which vanes extend parallel to the axis of its respective shirring roll and said outer ends including a concave arcuate groove, the curvature of which groove corresponds to the surface of the mandrel which it faces, the path of the grooves of the vanes of each shirring roll, as they pass closest to the mandrel, overlapping the path of the grooves of the vanes of the two adjacent shirring rolls, when viewed along the axis of the mandrel, and means for rotating the shirring rolls in timed relation with each other and at a speed of the same order of magnitude as the speed of revolution of the shirring rolls about the mandrel, and the vanes of each shirring roll being positioned circumferentially about its axis such that upon revolution of the assembly about the mandrel, the vanes of any shirring will directly follow the vanes of the preceeding shirring roll, taken in the direction of revolution and in the direction of advance of the tubular material.

2. A device according to claim 1, wherein the said speed ratio is 1:1.

3. A device according to claim 1, wherein the speed ratio is within the limits of 1:2 and 2:1.

4. A device according to claim 1, wherein the ratio of the speed of rotation of the shirring rolls to the speed of revolution of the assembly about the mandrel is constant.

5. A device according to claim 4, including means for rotating the shirring rolls in direct response from the revolving movement of the roll assembly about the mandrel.

6. A device according to claim 5, wherein the shirring rolls are directly connected with a spur gear which together with the said assembly revolves about the mandrel and thereby rolls on a stationary annular helical gear.

7. A device according to claim 1, wherein there are four shirring rolls.

8. A device according to claim 1, wherein the ends of the grooves in the advance direction when the assembly is revolving about the mandrel are rounded outwardly.

9. A device according to claim 1, wherein the vanes of the shirring rolls are made of an elastic material.

10. A device according to claim 9, wherein the said elastic material is synthetic rubber.

* * * * *